United States Patent [19]

Witt

[11] 4,086,748
[45] May 2, 1978

[54] ROTARY CUTTING SYSTEM

[75] Inventor: Wilmer E. Witt, Appleton, Wis.

[73] Assignee: Koehring Company, Brookfield, Wis.

[21] Appl. No.: 697,544

[22] Filed: Jun. 18, 1976

[51] Int. Cl.² .............................................. A01D 45/02
[52] U.S. Cl. .......................................... 56/98; 56/102
[58] Field of Search ...................................... 56/94–102, 56/157, 295, 14.5, 119, 53; 30/276

[56] References Cited

U.S. PATENT DOCUMENTS

| | | | |
|---|---|---|---|
| 475,418 | 5/1892 | Robbins | 56/94 |
| 705,923 | 7/1902 | Hadley | 56/102 |
| 3,507,104 | 4/1970 | Kline et al. | 56/295 |
| 3,813,858 | 6/1974 | McDermott | 56/102 |
| 3,940,913 | 3/1976 | Wallenfang et al. | 56/14.5 X |
| 3,961,466 | 6/1976 | Martin et al. | 56/53 |

*Primary Examiner*—Jay N. Eskovitz
*Attorney, Agent, or Firm*—Andrew J. Beck

[57] ABSTRACT

A rotary cutting system for use with a row crop harvesting apparatus includes a pair of contra-rotating sickle assemblies operating in conjunction with a system of flexible, toothed crop-gathering belts. Each sickle assembly includes at least a pair of multi-toothed sickle blades arranged to cooperate with a stationary cutting member. As the belts are driven to gather in crop material, the sickle blades function to sever the material near ground level, the two sickel assemblies being arranged to operate simultaneously on two adjacent rows of crop material. Mirror-image construction of the sickle assemblies permits use of sickle blades having multiple, double-edged teeth such that the blades can be interchanged between assemblies for optimum blade utilization. The stationary cutting member is also of double-edged construction and is mounted for reversible operation. The multi-toothed rotating blades are mounted on a circular blade support member and each blade covers about half of the area thereof such that the blades mounted side-by-side provide a continuous 360° pattern of cutting teeth. Each adjacent pair of teeth in the 360° pattern includes two mutually parallel cutting edges. The stationary cutting member is positioned at a small angle with respect to the cutting plane so that only the cutting edge of the cutting member contacts the rotating blade.

24 Claims, 7 Drawing Figures

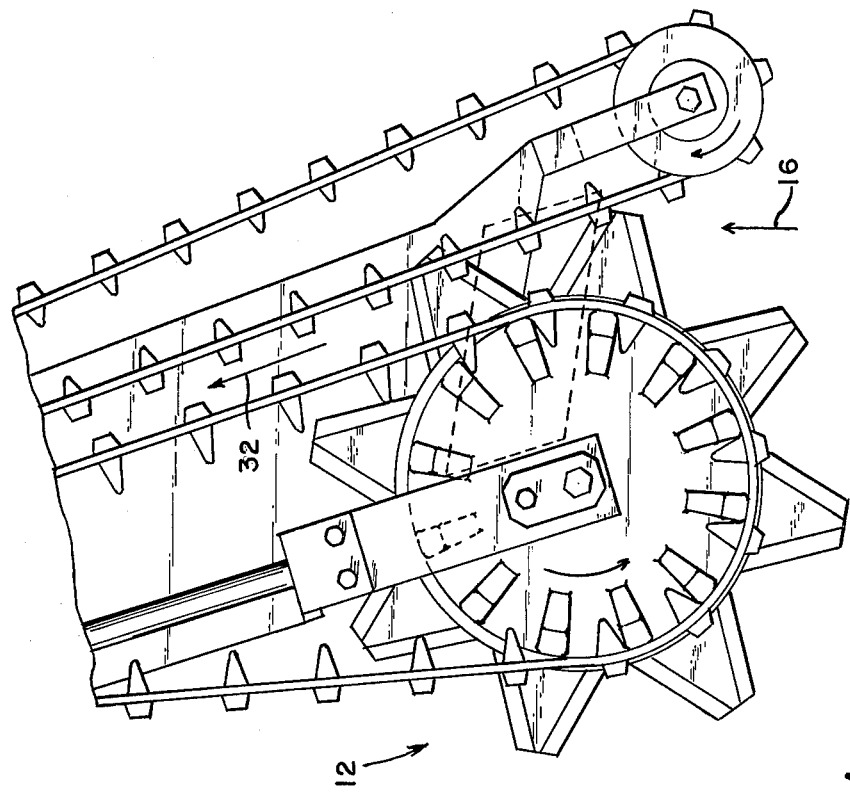
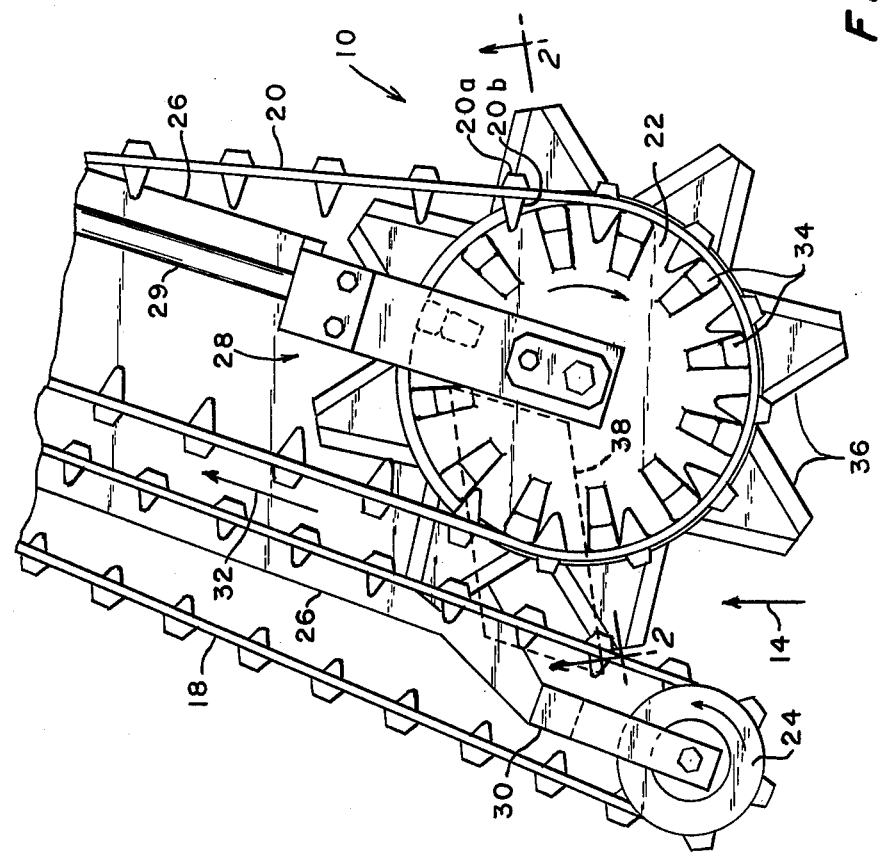
Fig. 1

ROTARY CUTTING SYSTEM

FIELD OF THE INVENTION

The present invention pertains to a rotary cutting system and, more particularly, to an improved rotary sickle arrangement for use therein whereby highly efficient and reliable rotary cutting operation is obtained.

BACKGROUND OF THE INVENTION

A problem that has been experienced in the operation of rotary cutting systems stems from the fact that all cutting edges on the rotary blade must be maintained in a common cutting plane if the most efficient cutting action is to be obtained. Since all of the cutting edges must coact with a common stationary cutting edge, misalignment of one or more of the rotary edges may seriously degrade the quality of the cutting action and thus severely reduce the effectiveness of the entire cutting system.

Blade alignment problems may be resolved by utilizing a greater number of pre-aligned, integrally constructed components. However, use of integrally constructed components makes it more difficult to replace broken, worn or chipped parts such as cutting edges or blade teeth. From a repair standpoint, the ideal form of rotary sickle construction would provide a plurality of independently removable cutting teeth so that whenever a cutting edge is damaged it can be individually replaced. However, use of independently mounted cutting edges leads to substantial difficulties in maintaining the several cutting edges in proper alignment whereupon such systems require frequent adjustment and extensive maintenance which in turn leads to inefficient, unreliable and expensive operation.

OBJECTS AND SUMMARY OF THE INVENTION

It is accordingly an object of the invention to provide an improved rotary cutting system.

A further object is to provide an improved rotary cutting system utilizing a unitary sickle blade having multiple cutting edges thereon such that alignment between the rotary cutting edges and a stationary cutting member cooperating therewith is readily obtained without a substantial amount of adjustment and may be preserved without undue maintenance requirements.

Still a further object is to provide an improved rotary cutting system having multiple rotary sickle assemblies constructed in a manner such that double-edged, multi-toothed cutting blades can be interchanged between assemblies quickly and simply to permit maximum blade utilization.

Yet another object is to provide an improved rotary sickle assembly utilizing a unitary, multi-toothed rotary cutting blade arranged to cooperate with a stationary cutting member in a manner which produces a highly efficient cutting action.

Yet a further object is to provide an improved rotary sickle assembly utilizing a double-edged stationary cutting member mounted for reversible cooperation with the rotary blades whereby optimum utilization of the stationary cutting member is realized.

Additional objects and advantages of the invention will be set forth in part in the description that follows, and in part will be apparent from the description, or may be learned by practice of the invention. The objects and advantages of the invention may be realized and attained by means of the instrumentalities and combinations particularly pointed out in the appended claims.

To achieve the foregoing objects and in accordance with one aspect of the invention, a rotary cutting system is provided wherein a rotary cutting blade of unitary construction having multiple cutting edges thereon is utilized in cooperation with a stationary cutting member of substantially planar configuration, the stationary member being mounted at an angle with respect to the rotary cutting plane such that only the cutting edge of the stationary cutting member contacts the rotary blade. The cutting edge of the stationary cutting member furthermore engages the rotary blade along a substantial portion of the distance from the axis of rotation of the rotary blade to the outer end of the rotary cutting edges. Such construction eliminates frictional interaction between the flat surfaces of the rotary blade and stationary cutting member and produces a highly efficient cutting action at minimum power levels.

In accordance with a further aspect of the invention, a rotary sickle assembly is provided wherein at least a pair of multi-toothed, unitary rotary cutting blades are mounted on a rotating blade support member in side-by-side relationship to provide a continuous, 360° pattern of cutting teeth arranged to travel in a common cutting plane. By virtue of the integral construction of the unitary blade members, an extremely rigid rotary blade construction is obtained whereby problems due to blade flexure and misalignment are minimized.

In accordance with yet another aspect of the invention, a rotary cutting system is provided with a pair of rotary sickle assemblies of generally similar design wherein the respective stationary cutting members operating therewith are arranged in "mirror image" relationship relative to the respective rotary cutting planes. The blades utilized with the two assemblies are rotated in opposite directions and utilize a double-edged, symmetrical cutting tooth design such that the blade members are interchangeable between the two assemblies to enable optimum blade utilization.

These and other objects, features and advantages will be made apparent by the following description of the preferred embodiment of the invention, the description being supplemented by drawings as follows:

BRIEF DESCRIPTION OF THE DRAWINGS

FIG. 1 is a plan view showing a rotary cutting system employing a pair of "mirror image" rotary sickle assemblies arranged in accordance with an exemplary embodiment of the invention.

DESCRIPTION OF THE PREFERRED EMBODIMENT

Figure 2:
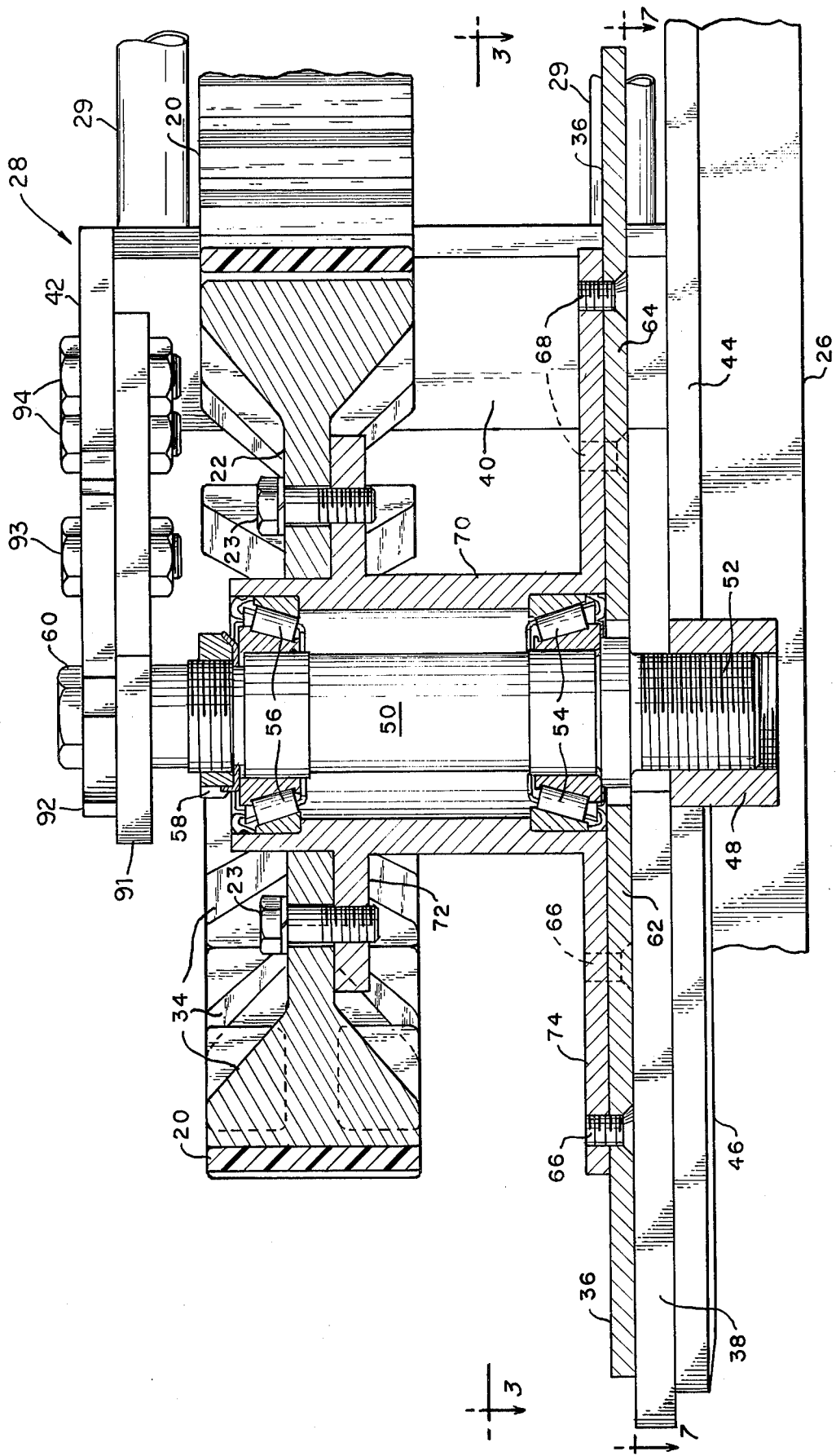
FIG. 2 is a side elevation view, taken along line 2—2 of FIG. 1, showing one of the rotary sickle assemblies of the system of FIG. 1 in center cross-section.

Referring to FIG. 1, a rotary cutting system is shown including a pair of harvesting heads 10 and 12. The two heads are constructed in "mirror image" fashion and may be mounted for example on the front of a row crop harvesting apparatus such as is shown and described in U.S. Pat. No. 3,940,913 entitled "Row Crop Harvesting Apparatus" issued on Mar. 2, 1976 to J. A. Wallenfang and W. E. Witt. As the apparatus is driven through a field, adjoining rows of, for example, corn stalks, feed into the mouths of the harvesting heads 10 and 12 in the direction of the arrows 14 and 16.

Since the two heads are of substantially identical "mirror image" construction, only the left-hand head 10 is hereinafter described in detail. The head 10 includes an idler sprocket 24 together with a rotary sickle assembly comprising, generally, idler sprocket 22, sickle teeth 36 and mounting clevis 28. The latter, together with a clevis 30 arranged to support sprocket 24, are supported on a base plate 26. Sprocket 22 cooperates with a flexible, toothed belt 20 which may be fabricated, for example, of composition rubber material. Belt 20 is provided with a plurality of transversely arranged outer lugs 20a and a plurality of inner lugs 20b. The latter cooperate with drive lugs 34 on sprocket 22 in order to rotate the assembly and drive the sickle blades in a clockwise direction.

A second belt 18, similar in construction to belt 20, cooperates with sprocket 24, rotating the latter in counterclockwise direction. Sprocket 24 may be constructed, for example, as shown and described in the copending application entitled "Self-Cleaning Sprocket Assembly" filed by J. A. Wallenfang.

Belts 18 and 20 are entrained at their opposite ends (not shown) about a pair of drive sprockets which are operated by an appropriate source of drive power to impart the indicated motion to the belts and sprockets 22 and 24. The outer lugs on the moving belts operate to gather in crop material and to convey it along the channel indicated by arrow 32 to a processing station (not shown).

To provide for severance of the crop material as it enters the conveying channel, rotary sickle blades having multiple teeth 36 are mounted below the channel and are adapted to be driven by idler sprocket 22. The blades are mounted on a blade support member which is suspended below sprocket 22 in a manner to be described in detail hereinafter. A stationary cutting member 38 is supported below the mouth of the crop conveying channel and arranged to cooperate with the cutting edges on the rotating teeth 36. Thus, crop material gathered in by the action of belts 18 and 20 is severed by the operation of the rotary sickle assembly as it enters the conveying channel.

Figure 5:
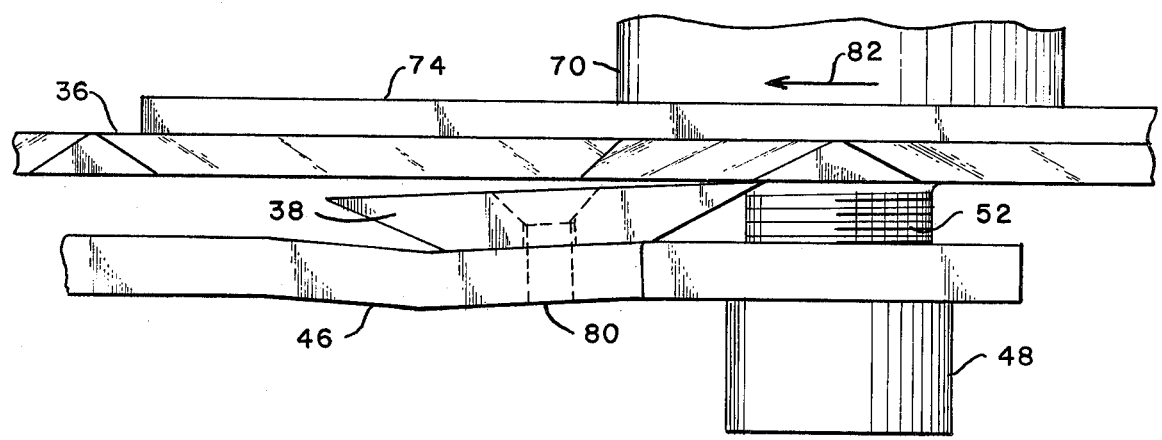
FIG. 5 is a side elevation view, taken along line 5—5 of FIG. 3, showing the interrelationship between the rotating blade and stationary cutting member of the rotary sickle assembly.

Referring to FIG. 2, which shows the rotary sickle assembly in cross-sectional elevation, it is seen that sprocket 22 is mounted for rotation about a stationary shaft 50. Sprocket 22 is rigidly secured by bolts 23 to an annular flange 72 integrally connected to a cylindrical spindle 70. Spindle 70 is supported for rotation about shaft 50 by roller bearings 54 and 56. The sprocket teeth 34 each includes a pair of drive lugs or tangs extending, respectively, above and below the plane of the disk-shaped sprocket plate 22. The inner teeth of the drive belt 20 are arranged in split fashion, such as shown in FIG. 5 of the aforementioned patent U.S. Pat. No. 3,940,913, so as to straddle the sprocket plate while simultaneously engaging both the upper and lower lug portions of the teeth 34.

An angular blade support member 74 extends from the lower end of spindle 70 and serves as a support for at least a pair of unitary, multi-toothed blade members 62 and 64, each of which is provided with a plurality of teeth 36. Blade 62 is secured to the lower surface of blade support member 74 by a plurality of flathead machine screws 66. The heads of the screws are seated in countersunk recesses in the blade so as not to interfere with the cutting action. In similar fashion, blade 64 is secured to the lower surface of blade support member 74 by a plurality of flathead, countersunk machine screws 68. Countersinking of the screw heads minimizes the tendency of foreign material to foul in the rotating structure.

The above-described rotating assembly is mounted in a clevis 28 which includes a crossmember 40, an upper side arm 42 and a lower side arm 44. An extension plate 91 is mounted to the underside of upper side arm 42 by fasteners 94 and is formed with a circular hole through which shaft 50 passes. The clevis may be secured to base plate 26 by conventional means, such as, for example, welding and support pipes 29 may be provided to lend rigidity and further strenthen the mounting structure.

The stationary cutting member 38 is mounted below the blades 62, 64 on an arm 46 which extends from and is an integral part of, the lower side arm 44 of clevis 28. As will be described in further detail hereinafter, a cutting edge provided on cutting member 38 interacts with the cutting edges of the rotating teeth 36 to provide a shearing action which severs the entering crop material.

The lower portion of shaft 50 is provided with a set of threads which engage internal threads provided in the shaft support member 48. The latter is formed as an integral part of the lower clevis side arm 44 and the associated support arm 46. In order to provide for vertical adjustment of the rotating assembly, so as to adjust the interaction between stationary cutting member 38 and the rotating teeth 36, the upper end of shaft 50 is provided with a hexagonal head which, when rotated, turns thread 52 thereby producing a vertical adjustment motion of shaft 50. Shaft 50 is locked in vertical position with a retainer plate 92 fixed to the top of extension plate 91 by fastener 93. A nut 58 positioned at the upper end of the shaft assembly is used to adjust clearance of two tapered roller bearings 54 and 56.

Figure 3:
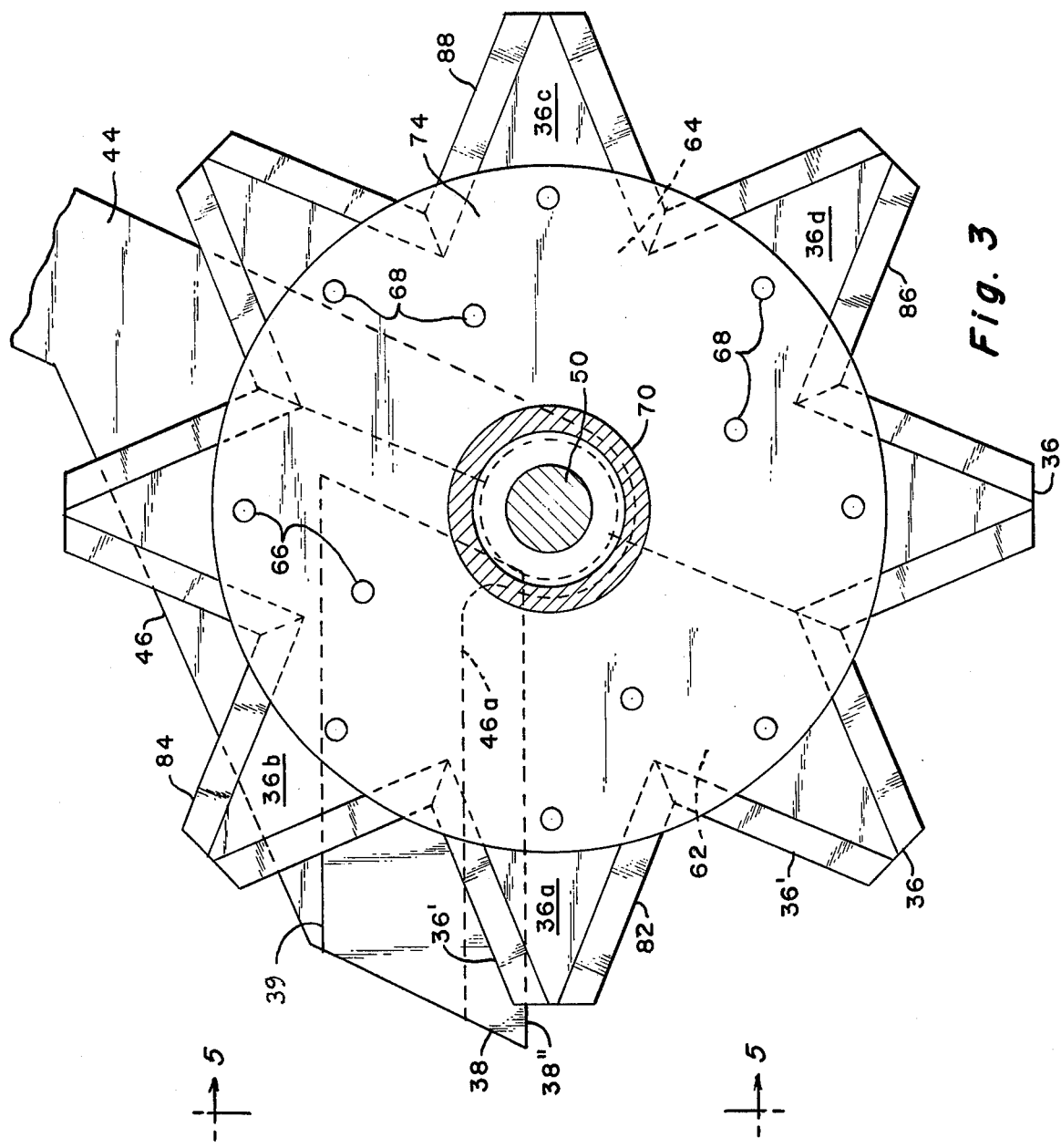
FIG. 3 is a plan view of a portion of the sickle assembly of FIG. 2 taken along sectional line 3—3 thereof.

Referring to FIG. 3, which is a view taken along cross-sectional line 3—3 of FIG. 2, the details of the multi-toothed blade members 62, 64 and their relationship to blade support member 74 and to stationary cutting member 38, are illustrated. It is noted that each of the blades is provided with four trapezoidally shaped teeth 36. The two blades 62 and 64, when mounted as shown in side-by-side fashion on blade support member 74, engage substantially the entire bottom surface thereof and are firmly held in place by the six machine screws 66 and 68. The integral, unitary construction of the paired blade sections, together with the solid plate construction of support member 74, assures an extremely rigid and flex-free rotational structure.

Stationary cutting member 38 is mounted on arm 46 immediately beneath the rotating blades. Arm 46 is an integral extension of the lower clevis side arm 44. The cutting member 38 is shaped in the form of a parallelogram and is provided with cutting edges 38" and 39 (also see FIG. 7) on each of the longer sides thereof. As shown in FIG. 3, cutting edge 38" is in position to coact with the forward cutting edges 36' of the rotating blades as the latter rotate in the clockwise direction about shaft 50. The cutting edges 38" and 39 extend from beyond the cutting edges of teeth 36 toward the central shaft 50. In the event that unwanted material is forced toward the center of the rotary sickle, the extra length of cutting member 38 provides a cleaning action and operates to shear the material to prevent it from winding around the shaft 50 thus providing a cleaning action. Each cutting edge 36' moves past the stationary cutting edge 38" in a manner so as to produce a progressive shearing action for optimum cutting effectiveness. Cutting edge 38" extends slightly forward of the front edge 46a of support member 46 and is substantially parallel to, and offset from, a radial line extending from the center of shaft 50.

As is apparent, when the stationary cutting member 38 is removed from support member 46 and rotated 180° in the plane shown, the opposite cutting edge 39 will be positioned for operation with the rotating cutting edges 36'. After reversal of the member 38 in this manner, the interrelation between the respective cutting edges will be exactly as shown in FIG. 3 for the edges 36' and 38".

FIG. 5 shows the assembly of FIG. 3 in side elevation. Support member 46 is shaped so as to provide a slightly angled or tilted seat for stationary cutting member 38. The substantially planar top surface of the stationary cutting member therefore lies in a plane which intersects the cutting plane defined by the teeth 36 at an acute angle which may be, for example, on the order of 4 degrees. Thus, only the forward cutting edge of the member 38 is permitted to contact the rotating blades. This eliminates the substantial friction which would be generated if the rotating blades were allowed to interact with the entire upper surface of cutting member 38. It also substantially reduces the tendency of the blade teeth 36 to be flexed upwards and away from the forward cutting edge of member 38 by the accumulation of debris between the stationary and rotating blade members. Furthermore, the tilted orientation of the stationary cutting member, in allowing contact between the stationary and rotating blades only along an edge of the former, reduces the power required to drive the rotating assembly and thus achieves a smoother, more efficient cutting action.

Figure 7:
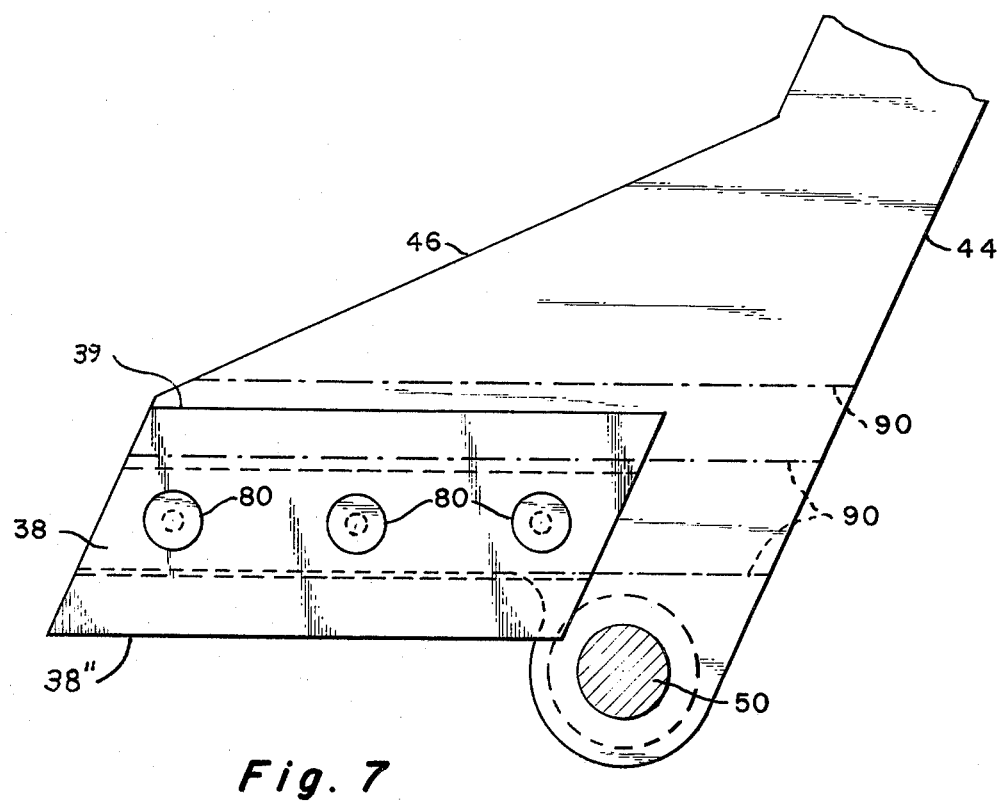
FIG. 7 is a plan, sectional view, taken along line 7—7 of FIG. 2, showing the lower arm of the supporting clevis for the rotary assembly and specifically illustrating the stationary cutting member and its associated support structure.

Referring to FIG. 7, it can be seen that stationary cutting member 38 is removably secured to the stationary support arm 46 by three flathead, countersunk machine screws 80 whereby the cutting member may be quickly and easily removed for reversal and/or replacement. The integral support structure including arm 46 and clevis side arm 44 can be provided with the appropriate angled seating area by creasing the unit along breaklines 90 in an appropriate forming tool such as a breakpress.

Figure 6:
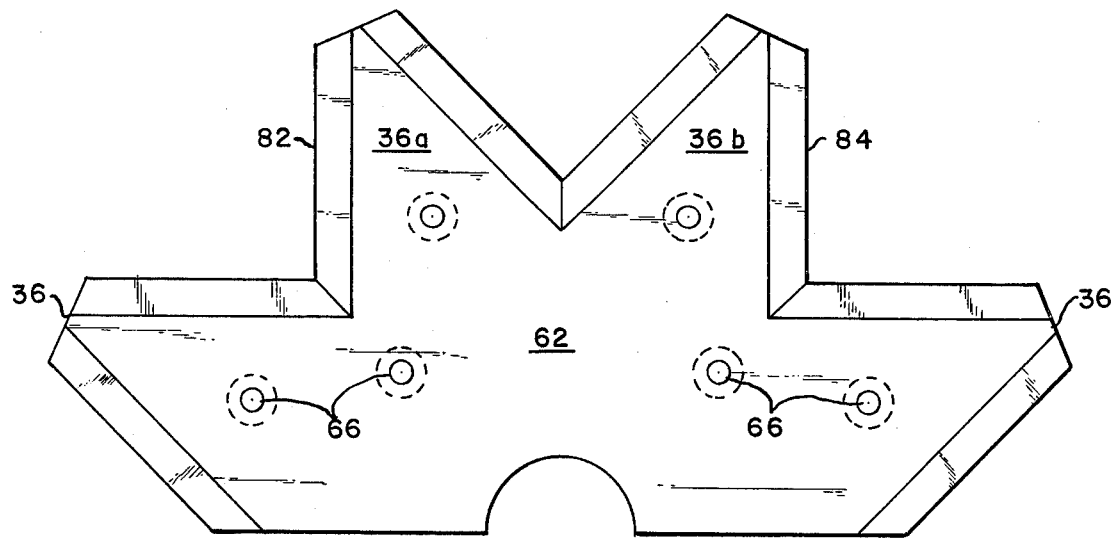
FIG. 6 is a plan view of one of the multi-toothed, unitary blade members.

FIG. 6 shows the unitary, multi-toothed rotating blade 62 in plan view. The blade comprises a sector-shaped central portion such as a substantially semi-circular portion having four teeth 36 projecting outwardly therefrom. The essentially semi-circular central portion of the blade is defined by the arc interconnecting the innermost points of each of the cutting edges. It is seen that each pair of adjacent teeth 36, such as teeth 36a and 36b, have two mutually parallel cutting edges, i.e., edges 82 and 84. Each of the double-edged teeth 36 is symmetrical about a plane bisecting the tooth and passing through the axis or rotation of the blade. As shown in FIG. 3, each adjacent pair of teeth 36 such as the pair 36a, 36b is positioned in diametric opposition to a like pair of adjacent teeth, i.e., teeth 36c and 36d. The mutually parallel cutting edges 86 and 88 of the latter are in line with the edges 82 and 84, respectively. Thus, each adjacent pair of teeth is diametrically opposed to another adjacent pair of teeth, with each of the pairs having two mutually parallel edges arranged such that each of such edges is in line with one of the mutually parallel edges of the opposite pair of teeth.

It is therefore seen that in accordance with the invention, as illustrated in the example given by the above described preferred embodiment, there is provided a rotatable blade support member and means for mounting the blade support member for rotation about an axis. As embodied in the above-described apparatus, the rotatable blade support member includes the circular plate 74 and the associated spindle 70. The mounting means includes the stationary shaft 50, clevis 28 and the associated ancillary structural elements.

Further in accordance with the invention there is provided a unitary blade having a plurality of cutting edges which are arranged to travel in a cutting plane perpendicular to the axis of rotation. As embodied in the above-described apparatus, the unitary blade may be, for example, the blade 62 which is provided with eight cutting edges on the associated teeth 36, four of which cutting edges are capable of cooperating with the stationary cutting member 38. Furthermore, the invention as herein described includes a substantially planar cutting member and stationary support means therefore, the latter being constructed so as to support the cutting member in a plane intersecting the rotary cutting plane at an acute angle. As herein embodied, the planar cutting member includes the member 38 and the stationary support means comprises the arm 46 which extends from the lower clevis side arm 44.

OPERATION

In operation, the rotary sickle assembly as herein described is driven in a continuous rotary motion by drive belt 20 (FIG. 1). Crop material gathered between the two belts 18 and 20 is severed by the cutting action produced by passage of the rotating teeth 36 over the stationary cutting edge of member 38.

Figure 4:
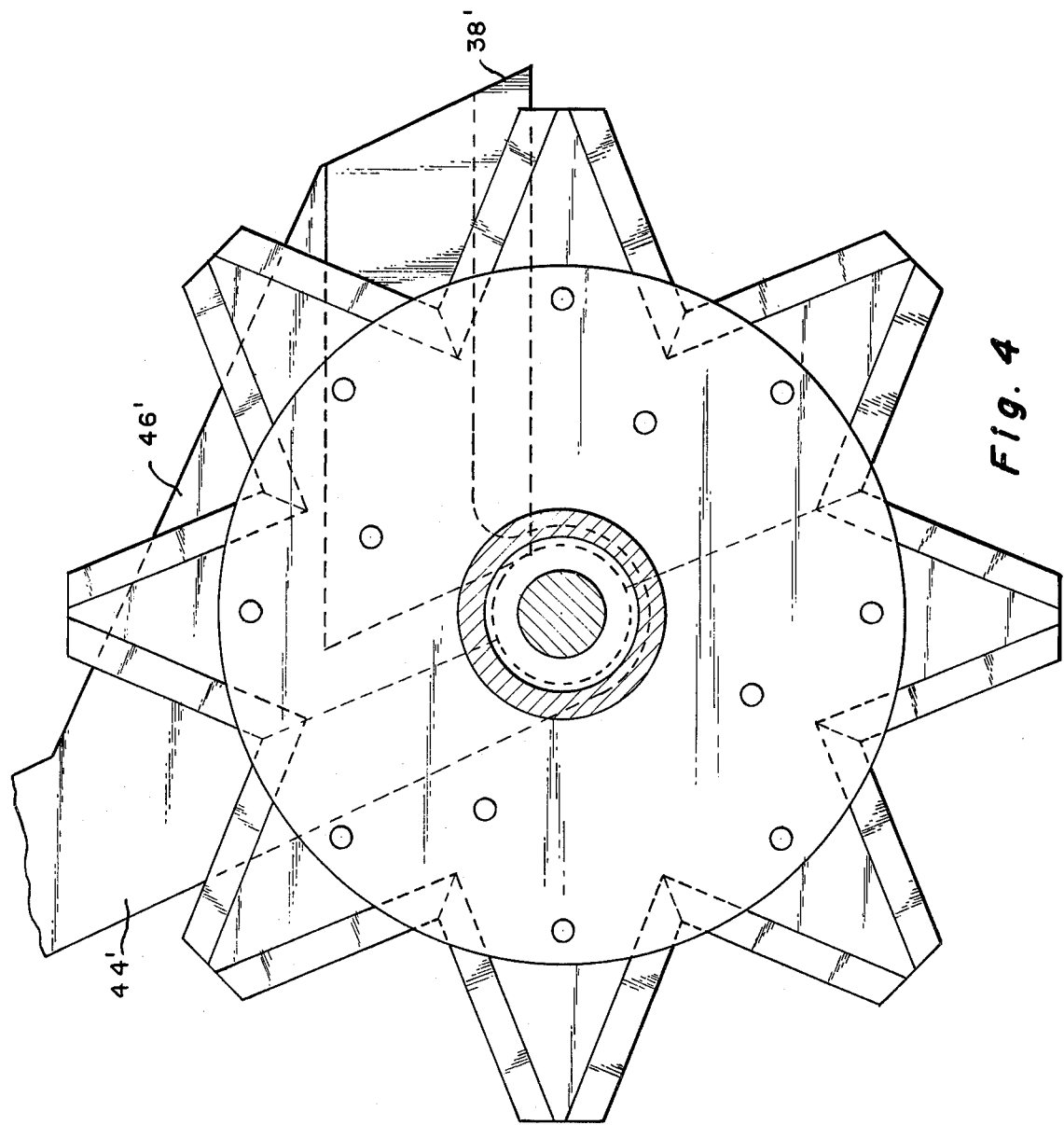
FIG. 4 is a plan view similar to that of FIG. 3 illustrating a portion of the second rotary sickle assembly shown in FIG. 1.

FIG. 4 illustrates the "mirror image" construction of the two rotary sickle assemblies shown in FIG. 1. As can be seen by comparing FIGS. 3 and 4, the latter of which illustrates the lower portion of the sickle assembly of head 12, the rotating portion of the assemblies is substantially identical. However, the portion of the supporting structure including lower clevis side arm 44' and its associated support arm 46' together with the stationary cutting member 38' of the FIG. 4 assembly bears a mirror image relationship to the corresponding elements 44, 46 and 38 shown in FIG. 3. The individual rotating blade sections, which are of substantially identical construction, can be used interchangeably in either of the two assemblies. However, because the two assemblies rotate in opposite directions, a different set of rotating cutting edges is employed with each of the different assemblies. Thus, by interchanging blade sections between the two assemblies maximum blade life is obtained. Furthermore, since blade installation is made extremely simple by the use of only six machine screws for each blade section, blade changes can be made easily and quickly in the field. Thus, if a cutting edge is nicked or broken in operation, the cutting system can be restored to full effectiveness simply by interchanging the damaged blade section with one of the blade sections from the other rotating assembly. Still further, because of the unitary, multi-toothed construction of the blades, a much more rigid rotating assembly is obtained and alignment problems due to blade flexure and mounting irregularities, which in the past have presented substantial difficulties, are greatly reduced.

Moreover, the unique pattern of teeth used on the blades in accordance with the invention, wherein each adjacent pair of teeth has two mutually parallel cutting edges, greatly facilitates manufacture of the blade sections in that two cutting edges can be milled at the same time. Also, by providing four teeth on each blade section, such that the angle between adjacent teeth is 90 degrees, each tooth has a relatively wide base which contributes even further to the rigidity of the rotating assembly and the realization of the flex-free operation.

It is additionally noted from the above description that the stationary cutting member which operates in cooperation with the rotating blades is positioned at an angle with respect to the latter so that only the cutting edge of the stationary cutting member contacts the blades. This further contributes to low power, efficient, vibration-free cutting operation. Furthermore, the reversible configuration of the stationary cutting member further extends the blade life of the unit and minimizes maintenance and downtime.

It will be apparent to those skilled in the art that changes in the form and details of the above-described preferred embodiment may be effected without departing from the true spirit and scope of the invention.

What is claimed is:

1. In a crop handling apparatus, the improvement comprising a rotary sickle assembly including:
   a rotatable blade support member;
   means for mounting said blade support member for rotation about an axis;
   means for rotationally driving said blade support member about said axis;
   a blade mounted on said blade support member for rotation therewith, said blade having a central portion with a plurality of cutting edges projecting outwardly therefrom and arranged to travel in a cutting plane perpendicular to said axis, said central portion being affixed to said support member and extending inwardly thereon to a point near said axis;
   a substantially planar cutting member having a cutting edge; and
   stationary support means constructed and arranged to support said planar cutting member in a plane intersecting said cutting plane at an acute angle and to position the cutting edge of said cutting member in contact with said blade along a line extending across substantially the full radial dimension thereof whereby said cutting edges cooperate to provide a shearing action and said cutting member cooperates with the central portion of said blade to provide a cleaning action.

2. The rotary sickle assembly set forth in claim 1 further comprising:
   means for adjusting the position of said rotatable blade support member relative to said stationary support means along the line of said axis whereby blade wear can be compensated for and said cutting engagement between said blade and said cutting member can be maintained.

3. The rotary sickle assembly set forth in claim 1 wherein said blade comprises a plurality of double-edged teeth, each of said teeth being symmetrical about a plane perpendicular to said plane of rotation and passing through said axis.

4. The rotary sickle assembly set forth in claim 3 wherein each adjacent pair of teeth on said blade has two mutually parallel edges.

5. The rotary sickle assembly set forth in claim 1 wherein said blade is attached to said rotatable blade support member at points located in close proximity to the areas where said teeth join said central portion whereby the teeth on said blade are supported so as to resist bending and vibration.

6. A rotary sickle assembly comprising, in combination:
   a rotatable blade support member;
   means for mounting said blade support member for rotation about an axis;
   means for rotationally driving said blade support member about said axis;
   a pair of blades mounted on said blade support member for rotation therewith, each of said blades having a central portion with a plurality of cutting edges projecting outwardly therefrom and arranged to travel in a cutting plane perpendicular to said axis, said central portion being affixed to said support member and extending inwardly thereon to a point near said axis of rotation;
   a substantially planar cutting member having a cutting edge; and
   stationary support means constructed and arranged to support said planar cutting member in a plane intersecting said cutting plane at an acute angle and to position the cutting edge of said cutting member in contact with said blades along a line extending across substantially the full radial dimension thereof whereby said cutting edges cooperate to provide a shearing action and said cutting member cooperates with the central portions of said blades to eject foreign material from the area surrounding said axis of rotation.

7. The rotary sickle assembly set forth in claim 6 wherein each of said blades is of substantially identical construction and wherein a substantially continuous 360° pattern of teeth is provided by said pair of blades.

8. The rotary sickle assembly set forth in claim 7 wherein each tooth of said blades is of double-edged construction and is symmetrical about a plane perpendicular to said plane of rotation and passing through said axis.

9. The rotary sickle assembly set forth in claim 8 wherein each adjacent pair of teeth in said continuous 360° pattern has two mutally parallel edges.

10. The rotary sickle assembly set forth in claim 8 wherein each adjacent pair of teeth in said continuous 360° pattern is diametrically opposed to another adjacent pair of teeth, each of said pairs having two mutally parallel edges arranged such that each of said edges is in line with one of the mutually parallel edges of said opposite pair of teeth.

11. The rotary sickle assembly set forth in claim 1 wherein said cutting member is of double-edged construction and wherein said assembly further comprises means for removably affixing said cutting member to said stationary support means such that the position of said cutting member is reversible thereon, whereby opposite cutting edges of said cutting member can be selectively brought into cooperation with said blade cutting edges.

12. The rotary sickle assembly set forth in claim 11 wherein said cutting member is configured in the shape of a parallelogram with said cutting edges provided on opposed edges thereof.

13. A rotary cutting system comprising, in combination:

first and second rotary sickle assemblies, each said assembly including:
a rotatable blade support member; means for mounting said blade support member for rotation about an axis;
a blade adapted to be secured to said blade support member for rotation therewith, said blade having a central portion with a plurality of double-edged cutting teeth projecting outwardly therefrom and arranged to travel in a cutting plane perpendicular to said axis, said central portion being affixed to said support member and extending inwardly thereon to a point near said axis of rotation; and
a stationary cutting member mounted at an acute angle with respect to said blade and having an edge held in contact with said cutting teeth and said central portion of said blade to provide a shearing action in cooperation with said cutting teeth and to provide a cleaning action in the area surrounding said axis of rotation;
means for supporting the stationary cutting member of said first rotary sickle assembly in a first predetermined position relative to the cutting plane of said first assembly;
means for supporting the stationary cutting member of said second rotary sickle assembly in a second predetermined position relative to the cutting plane of said second assembly, said first and second predetermined positions bearing a mirror image relationship to one another;
means for rotating the blade support members for said first and second rotary sickle assemblies in opposite directions; and
means for removably securing said unitary blades to said rotatable blade support members whereby said blades are interchangeable between said sickle assemblies to enable utilization of both edges of said cutting teeth.

14. The rotary cutting system set forth in claim 13 wherein said means for supporting said stationary cutting members are further constructed and arranged to position said cutting members at an angle relative to the respective cutting planes of said sickle assemblies, whereby the cutting teeth of said blades come into contact with the respective stationary cutting members only along the cutting edges of the latter.

15. The rotary cutting system set forth in claim 14 further comprising:
means for adjusting the positions of said rotatable blade support members relative to the respective support means for said stationary cutting members whereby blade wear can be compensated for and said cutting engagement between said teeth and said cutting members maintained.

16. The rotary cutting system set forth in claim 13 wherein each of said blades is of substantially identical construction, the teeth of each said blade being symmetrical about a plane perpendicular to the cutting plane and passing through the axis of rotation of the respective blades.

17. The rotary cutting system set forth in claim 16 wherein each adjacent pair of teeth on said blades has two mutually parallel edges.

18. The rotary sickle assembly set forth in claim 13 wherein said blade is attached to said rotatable blade support member at points located in close proximity to the areas wherein said teeth join said central portion whereby the teeth on said blade are supported so as to resist bending and vibration.

19. A rotary cutting system comprising, in combination:

first and second rotary sickle assemblies, each said assembly including:
a rotatable blade support member;
means for mounting said blade support member for rotation about an axis;
a pair of blades adapted to be secured to said blade support member for rotation therewith, each of said blades having a central portion with a plurality of double-edged cutting teeth projecting outwardly therefrom and arranged to travel in a cutting plane perpendicular to said axis, said central portion being affixed to said support member and extending inwardly thereon to a point near said axis of rotation; and
a stationary cutting member mounted at an acute angle with respect to said blade and having an edge held in contact with said cutting teeth and said central portions of said blades to provide a shearing action in cooperation with said cutting teeth and to provide a cleaning action in the area surrounding said axis of rotation;
means for supporting the stationary cutting member of said first rotary sickle assembly in a first predetermined position relative to the cutting plane of said first assembly;
means for supporting the stationary cutting member of said second rotary sickle assembly in a second predetermined position relative to the cutting plane of said second assembly, said first and second predetermined positions bearing a mirror image relationship to one another;
means for rotating the blade support members of said first and second rotary sickle assemblies in opposite directions; and
means for removably securing said blades to said rotatable blade support members whereby said blades are interchangeable between said sickle assemblies to enable utilization of both edges of said cutting teeth.

20. The rotary cutting system set forth in claim 19 wherein said means for supporting said stationary cutting members are further constructed and arranged to position said cutting members at an angle relative to the respective cutting planes of said sickle assemblies, whereby the cutting teeth of said blades come into contact with the respective stationary cutting members only along the cutting edges of the latter.

21. A rotary sickle assembly comprising, in combination:
a circular blade support member;
clevis means for mounting said blade support member for rotation about an axis;
sprocket means connected to said blade support member;

drive means operatively engaging said sprocket means for rotationally driving said blade support member about said axis;

a pair of blades affixed to said blade support member for rotation therewith, each of said blades having a central portion being in engagement with and supported by substantially one half of the area of said blade support member and each said blade further including a plurality of symmetrical, double-edged cutting teeth projecting outwardly from said central portion and arranged to travel in a cutting plane perpendicular to said axis, said central portion extending inwardly along said support member to a point near said axis;

a substantially planar cutting member having a pair of cutting edges provided on opposed, parallel sides thereof;

stationary support means mounted on said clevis means and constructed and arranged to support said cutting member in a plane intersecting said cutting plane at an acute angle such that a cutting edge of said cutting member is maintained in contact with said cutting teeth and said central portions of said blades and operates to provide a shearing action in cooperation with said cutting teeth and a cleaning action in coooperation with said central portions; and means for removably affixing said cutting member to said support means such that the position of said cutting member is reversible thereon, whereby opposite cutting edges of said cutting member can be selectively brought into operation with the cutting teeth of said blade.

22. The rotary sickle assembly set forth in claim 21 wherein said blade is attached to said circular blade support member at points located in close proximity to the areas where said teeth join said central portion whereby the teeth on said blade are supported so as to resist bending and vibration.

23. In a crop handling apparatus, the improvement comprising a rotary sickle assembly including:

a rotatable blade support member;

means for mounting said blade support member for rotation about an axis;

means for rotationally driving said blade support member about said axis;

at least a pair of substantially identical blades mounted on said blade support member, each said blade including a sector shaped central portion integral with a plurality of cutting teeth projecting outwardly therefrom, said blades being positioned side-by-side on said blade support member so as to present a continuous 360-degree pattern of teeth having a plurality of cutting edges arranged to travel in a cutting plane perpendicular to said axis, the central portions of said blades extending inwardly along said support member to a point near said axis of rotation;

a cutting member having a cutting edge; and stationary support means constructed and arranged to support said cutting member in a position adjacent to said cutting plane and at an acute angle with respect thereto so that the cutting edge of said member contacts said blades along substantially the full radial dimension thereof whereby the cutting edges of said blades cooperate with the cutting edge of said cutting member to provide a shearing action and the central portions of said blades cooperate with said cutting member to provide a cleaning action.

24. The rotary sickle assembly set forth in claim 23 wherein said blade is attached to said rotatable blade support member at points located in close proximity to the areas where said teeth join said central portion whereby the teeth on said blade are supported so as to resist bending and vibration.

* * * * *